United States Patent [19]
Fabritius

[11] 3,901,087
[45] Aug. 26, 1975

[54] SAMPLING APPARATUS
[75] Inventor: Hannes Fabritius, Rajakyla, Finland
[73] Assignee: Ulmaelektra Oy, Helsinki, Finland
[22] Filed: Jan. 18, 1974
[21] Appl. No.: 434,424

[30] Foreign Application Priority Data
Nov. 29, 1972 Finland.............................. 3384/72
June 26, 1973 Sweden.......................... 089468/73
Nov. 28, 1973 Norway.............................. 4523/73
Nov. 29, 1973 Denmark........................... 6451/73

[52] U.S. Cl.............................................. 73/421 B
[51] Int. Cl............................................. G01n 1/14
[58] Field of Search......... 73/421 R, 421 B, 422 TC

[56] References Cited
FOREIGN PATENTS OR APPLICATIONS
720,161 12/1954 United Kingdom............... 73/421 B Primary Examiner—S. Clement Swisher
Attorney, Agent, or Firm—James E. Nilles

[57] ABSTRACT

Sampling apparatus for collecting liquid samples of predetermined size from a source of liquid comprises a sample measuring container having liquid level detecting electrodes and a drain valve, a suction tube through which liquid is drawn from the source into the measuring container, a vacuum pump having a pressure port and a vacuum port, a multiposition control valve for selectively connecting either port to the measuring container, and electronic control means for operating the multiposition valve to connect the vacuum pump pressure port to the measuring container for a 5 second time interval after the vacuum pump is started so as to pressurize the measuring container and backflush the suction tube (while the drain valve is closed) and for operating the multiposition valve to connect the vacuum pump vacuum port to the measuring container after the 5-second time interval to vacuumize the measuring container and draw in a sample of predetermined size, whereupon the electrodes detect this fact, the multiposition valve reconnects the vacuum pump pressure port to the measuring container to reflush the system for another 5-second time interval, and the pump stops and the drain valve reopens.

4 Claims, 2 Drawing Figures

SAMPLING APPARATUS

BACKGROUND OF THE INVENTION

1. Field of Use

The present invention relates generally to sampling apparatus for collecting liquid samples of a predetermined size from a source of liquid such as channels or basins. In particular, the invention relates to sampling apparatus of the type comprising a vacuum pump connected to a sample measuring container which comprises means for detecting the liquid level (sample size) and communicates by a suction tube with the sampling source, and which measuring container has in its lower part a draining tube with a drain valve; and including a control unit for the vacuum pump and the draining tube valve.

2. Description of the Prior Art

Sampling apparatus of the type described hereinbefore is known in the prior art, as is the principle of collecting the sample in a vacuumized measuring container which draws the sample through the sampling tube into the measuring container, until the liquid level electrodes detect the presence of the requisite liquid quantity in the measuring container, whereupon the suction phase is stopped and the sample quantity is emptied from the measuring container into a sample collecting container. However, prior art apparatus has the serious drawback that the suction tube for the sample, which is located in a basin or channel, may contain a stagnant, clarified sample, which may even differ considerably from the composition of the liquid surrounding the tube, and the sample that is drawn does not represent the situation prevailing at the time of sampling.

OBJECTS OF THE PRESENT INVENTION

The principle object of the invention is to provide improved sampling apparatus of the aforesaid character in which the drawbacks hereinbefore mentioned have been eliminated. This object is achieved by means of the invention wherein a multiposition control valve is connected between the vacuum pump and the sampling container and a control means or unit is provided for the vacuum pump, the draining tube valve and the multiposition valve which operates so that, immediately after the pump has started (and the draining valve closes), the multiposition control valve connects the delivery side of the pump for a given period, for instance five seconds, to the measuring container thereby flushing the suction tube and after this period switches the intake side of the pump to connect with the measuring container(while the draining valve remains closed) to draw in a valid sample which is subsequently emptied. This causes the action that, prior to the sampling, the tube is emptied of old sample and of such other impurities or plugs as there may be. Other objects and advantages of the invention will hereinafter appear.

THE DRAWINGS

The invention is described in more detail in the following specification with reference to the attached drawings, wherein FIG. 1 presents a sample device according to the invention; and FIG. 2 shows the circuit diagram of the control means or unit of the sampling device.

DESCRIPTION OF A PREFERRED EMBODIMENT

Figure 1:
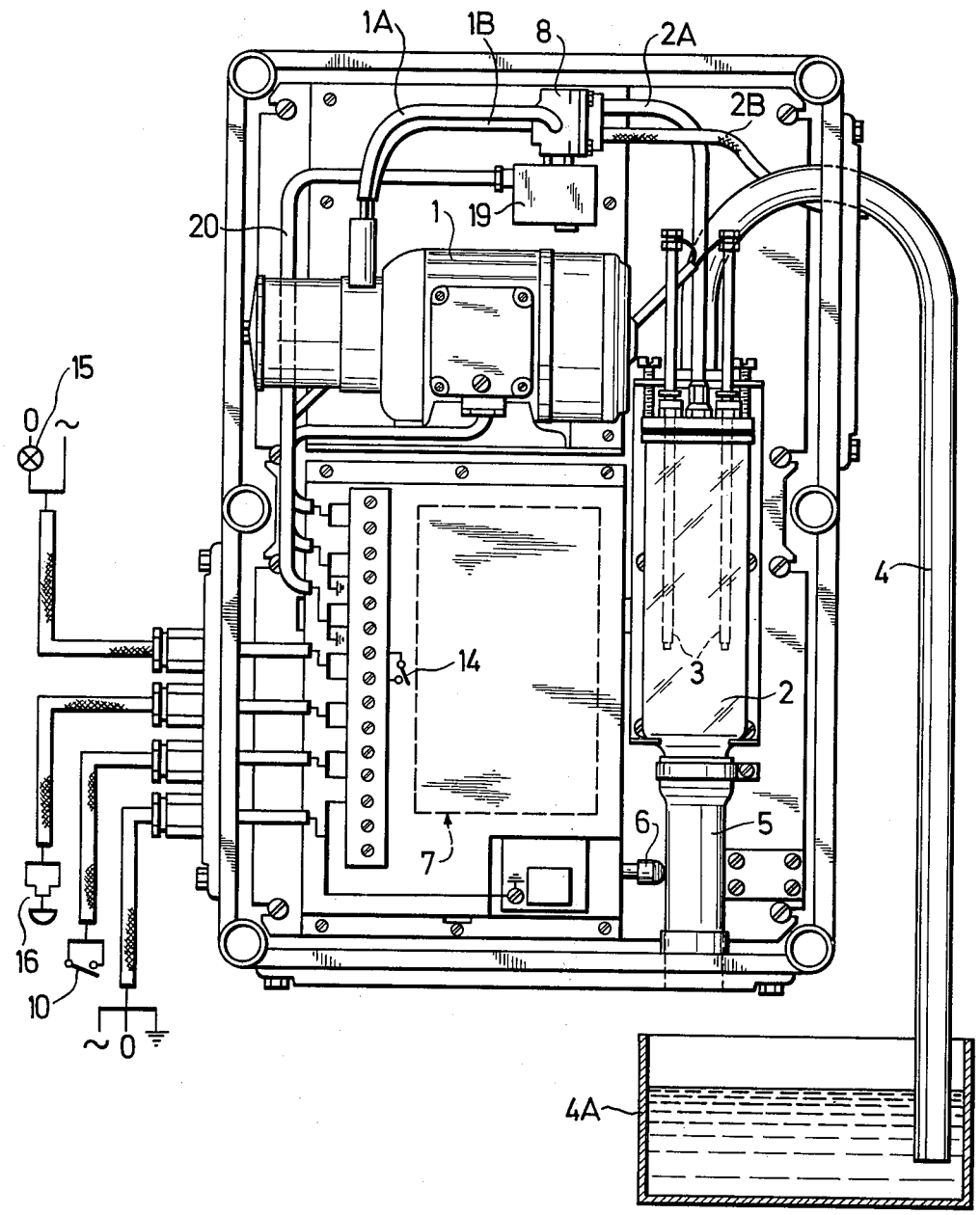

The sampling device illustrated by FIG. 1 comprises a vacuum pump 1, which has been connected by tubes with a sample measuring container 2, which most appropriately consists of glass or of transparent plastic. The measuring container 2 contains measuring electrodes 3 for observing the liquid level. The measuring container 2 communicates by means of a passage in the form of a suction tube 4 with a source of liquid 4A, such as a channel or basin from which liquid samples are collected. Attached to the lower part of the measuring container 2 is a draining tube 5, which consists of an elastic material so that the reciprocal movement of a tube valve 6 may close or open the tube 5 by clamping action. An electronic control unit 7, shown diagrammatically in FIG. 2, controls both the vacuum pump 1 and the tube valve 6.

An essential component in the invention is a control valve means in the form of a multiposition (four-way) magnetically operated valve 8 connected between the vaccum pump 1 and the measuring container 2, by means of hoses 1A, 1B and 2A, 2B, respectively, and which is controlled by the control unit 7 so that immediately upon starting of the pump 1 (and closure of valve 6) the four-way valve 8 connects the delivery or pressure port side of the pump 1 (hose 1A) for a given period, for instance 5 seconds, to the measuring container 2. The over-pressure building up in the measuring container empties the suction tube 4 of the clarified liquid and plugs that may have formed. On conclusion of the said period, the four-way valve 8 switches the intake side or vacuum port (hose 1B) of the pump 1 to be connected with the measuring container 2 (while valve 6 still remains closed) where a vacuum is created and causes the sample to rise into the measuring container. As soon as the level of the sample reaches the measuring electrodes 3, the control electronics 7 detect or receive information of the presence of the desired sample quantity and deliver to the four-way valve 8 the command to switch once more the delivery side of the pump 1 to connect with the measuring container 2 for a given period, for instance about 5 seconds. Subsequently, the pump 1 stops and tube valve 6 returns to its open position.

Figure 2:
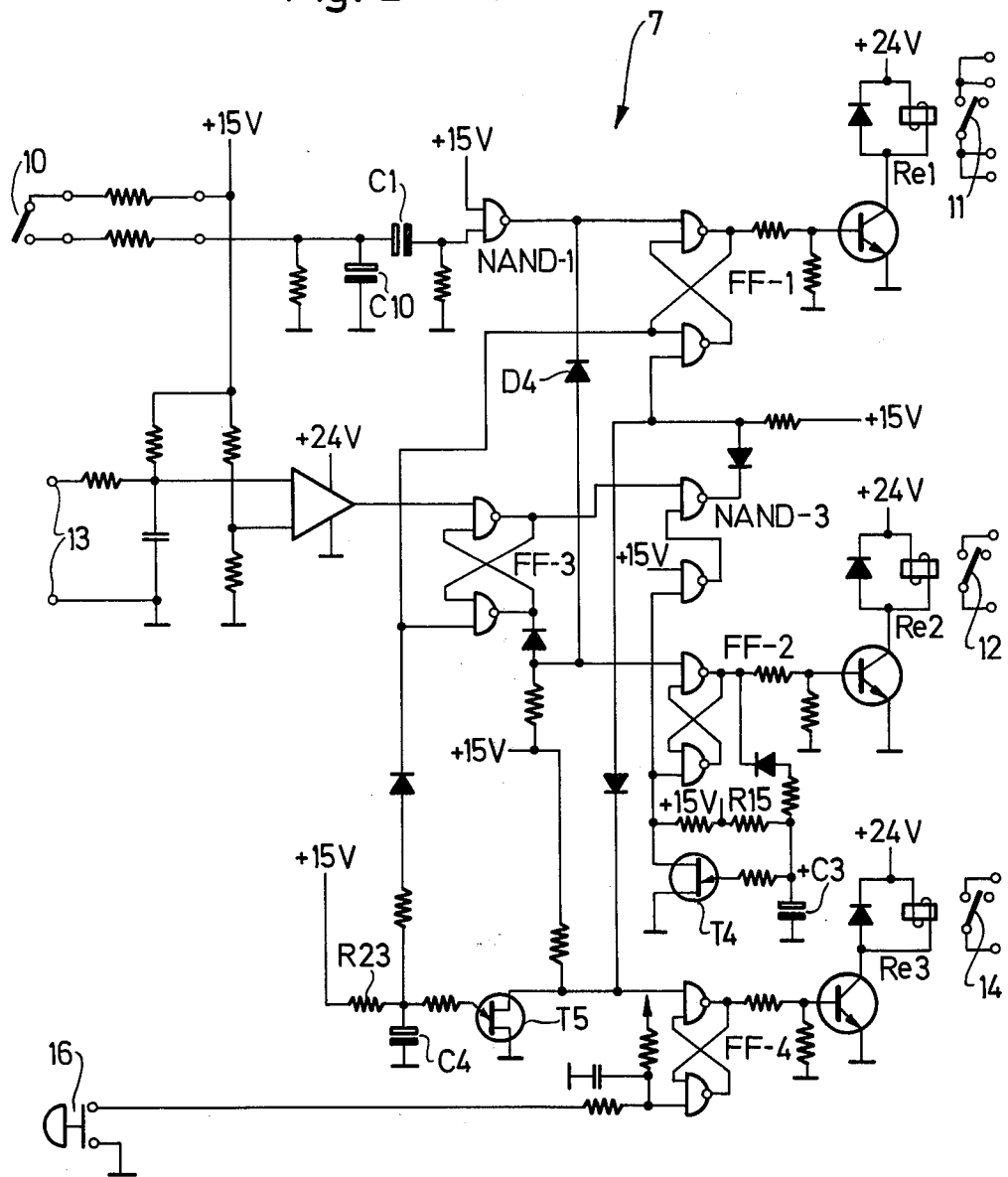

As will be seen later in connection with the description of FIG. 2, the control electronics have been augmented to manage faults as well as those instances in which the obtaining of a sample becomes impossible for one reason or another. The duration of the suction period is checked by means of an electronic guard, and the action is stopped after approximately 1 minute in case the sample has not ascended into the measuring container 2 by this time. The device is again ready for operation on receiving the next command and it will start the operating by blowing the sampling tube down as has been described.

In the following the mode of operation of the sampling device according to the invention is mainly described with reference to the circuit diagram of FIG. 2. Closure of the start contact 10 triggers the gate circuit NAND-1, which in turn, through the flip-flop circuit FF-1 and the diode D4, sets the flip-flop circuit FF-2, whereby the relay Re1 for the pump 1 and tube valve 6 and the control relay Re2 for the four-way valve 8 attract their armatures. Closure of the relay contact 11 starts the pump 1 and closes the tube valve 6, and closure of the relay contact 12 turns or directs the four-way valve 8 into a position in which the delivery side of the pump 1 communicates (through hoses 1A and 2A) with the measuring container 2. At the same moment, after an elapse of time determined by the time constant $T1 = R15 \times 3$, a unijunction transistor T4 inverts flip-flop circuit FF-2 and relay Re2 is de-energized, whereby the opening of relay contact 12 turns or directs the four-way magnet valve 8 into a position in which the intake side of the pump 1 communicates (through hoses 1B and 2A) with the measuring container 2. During the operations just described, immediately after flip-flop circuit FF-1 has been set, an automatic stopping circuit starts in order to anticipate the eventuality of disturbances which might occur during passage of a time interval determined by the time constant $T2 = R23 \times C4 \approx 1$ min. When the sample rises into the measuring container 2, it short-circuits the level measuring electrodes 3, which are connected to the terminals 13 of the control unit. This causes the level-detecting flip-flop circuit FF-3 to invert flip-flop circuit FF-2 and cause relay Re2 to be energized. At the same time, the five-second timing circuit T1 (having the time constant $T1 = R15 \times C3 \approx 5$ sec.) described hereinbefore is restarted. The gate circuit NAND 3 senses the level indication and the correct condition of unijunction transistor T4 and returns flip-flop circuit FF-1 to its initial position or condition. In this manner the full sampling cycle has been completed. If no level indication is received within about 1 minute after starting, unijunction transistor T5 sets the disturbance flip-flop circuit FF-4 and the alarm relay Re3 is energized and closes the relay contact 14, which connects the fault indicator 15. The reference numeral 16 indicates a normally open pushbutton switch which is closable manually by the system operator to indicate acknowledgement of the alarm by fault indicator 15. Unijunction transistor T5 also sets flip-flop circuit FF-1 into its initial position or condition, and relay Re1 releases its armature. During the discharge time of condensers C1 and C10 the sampling device cannot be restarted. The purpose of this interlocking is to protect the push magnet of the tube valve 6 against overheating, which ensues on excessively frequent sampling. The length of the interlocking period is approximately 3 minutes.

I claim:

1. Sampling apparatus for collecting liquid samples of predetermined size from a source of liquid comprising: a sample measuring container, passage means through which liquid is drawn from said source into said container, a vacuum pump having a pressure port and a vacuum port, detecting means connected to said container for detecting when a liquid sample of predetermined size has been drawn into said container, a drain valve for discharging said liquid sample from said container, multi-position control valve means for connecting either of said ports to said container, and control means for controlling said pump, said drain valve and said control valve means to connect said pressure port to said container for a first predetermined time interval after said pump is started and said drain valve is closed to pressurize said container and flush said passage means and to connect said vacuum port to said container after said first predetermined time interval to vacuumize said container and draw a sample of predetermined size into said container, said control means including a guard circuit, including timing means responsive to a failure of said detecting means to detect the presence of a liquid sample of predetermined size in said container within another time interval after said control valve means connects said vacuum port to said container, said guard circuit being operable to stop said pump and open said drain valve.

2. Sampling apparatus according to claim 1 wherein said control means includes alarm means responsive to operation of said guard circuit to provide an indication that no liquid sample of predetermined size has been deposited in said container.

3. Sampling apparatus for collecting liquid samples of predetermined size from a source of liquid comprising: a sample measuring container, detecting means connected to said container for detecting that a liquid sample of predetermined size is disposed therein, drain valve means connected to said container, passage means through which liquid is drawn from said source into said container, a vacuum pump having a pressure port and a vacuum port, control valve means for connecting either of said ports to said container, and control means for operating said pump, said drain valve and said control valve means, said control means operating said control valve means to connect said pressure port to said container for a predetermined time interval after said pump is started and said drain valve closes to pressurize said container and flush said passage means, said control means operating said control valve means to connect said vacuum port to said container after said predetermined time interval to vacuumize said container and draw liquid into said container, said control means being responsive to said detecting means for operating said control valve means to connect said pressure port to said container when a liquid sample of predetermined size is in said container to reflush said passage means for a second predetermined time interval and to stop said pump and open said drain valve after said second predetermined time interval, said control means including a guard circuit, including timing means responsive to a failure of said detecting means to detect the presence of a liquid sample of predetermined size in said container within another time interval after said control valve means connect said vacuum port to said container, said guard circuit being operable to stop said pump and open said drain valve.

4. Sampling apparatus according to claim 3 wherein said control means includes alarm responsive to operation of said guard circuit to provide an indication that no liquid sample of predetermined size has been deposited in said container.

* * * * *